US008295627B2

(12) United States Patent
Lin et al.

(10) Patent No.: US 8,295,627 B2
(45) Date of Patent: Oct. 23, 2012

(54) CIRCUIT FOR CONTROLLING COLOR SEQUENTIAL LIQUID CRYSTAL DISPLAY AND METHOD FOR CONTROLLING THE SAME

(75) Inventors: Chih-Yu Lin, Tanzih Township, Taichung County (TW); Chao-Chu Chang, Hukou Township, Hsinchu County (TW)

(73) Assignee: Sitronix Technology Corp., Hsinchu County (TW)

( * ) Notice: Subject to any disclaimer, the term of this patent is extended or adjusted under 35 U.S.C. 154(b) by 1004 days.

(21) Appl. No.: 12/254,103

(22) Filed: Oct. 20, 2008

(65) Prior Publication Data

US 2010/0039450 A1 Feb. 18, 2010

(30) Foreign Application Priority Data

Aug. 13, 2008 (TW) .............................. 97130861 A

(51) Int. Cl.
*G06K 9/40* (2006.01)

(52) U.S. Cl. ........................................ 382/254; 348/791

(58) Field of Classification Search .................. 382/162, 382/254; 348/751, 761, 791; 349/8, 78, 349/80, 108; 345/38, 50, 51, 87, 88

See application file for complete search history.

(56) References Cited

U.S. PATENT DOCUMENTS 6,335,778 B1 * 1/2002 Kubota et al. ................ 349/151
7,602,360 B2 * 10/2009 Park ................................ 345/89
7,737,963 B2 * 6/2010 Moon .......................... 345/212
2002/0024481 A1 * 2/2002 Kawabe et al. ................ 345/87
2003/0034939 A1 * 2/2003 Moon ............................ 345/76
2005/0094040 A1 * 5/2005 Wang et al. ..................... 349/19
2005/0200295 A1 * 9/2005 Lim et al. ...................... 315/150
2005/0253793 A1 * 11/2005 Chien et al. ..................... 345/87
2006/0007112 A1 * 1/2006 Park ............................. 345/102
2006/0125715 A1 * 6/2006 Choi .............................. 345/14
2007/0013626 A1 * 1/2007 Ando et al. ..................... 345/88
2007/0229433 A1 * 10/2007 Jang ................................ 345/96
2008/0158267 A1 * 7/2008 Kang et al. .................... 345/690
2009/0015166 A1 * 1/2009 Kwon ........................... 315/156

* cited by examiner

*Primary Examiner* — Jason M Repko
*Assistant Examiner* — Shervin Nakhjavan
(74) *Attorney, Agent, or Firm* — Ming Chow; Sinorica, LLC

(57) ABSTRACT

The present invention provides a circuit for controlling a color sequential liquid crystal display (LCD) and a method for controlling the same. The control circuit comprises a light-source driving circuit, a data driving circuit, and a scan driving circuit. The light-source driving circuit produces a driving signal for controlling the color sequential LCD to produce backlight with different colors. The data driving circuit produces a data signal and includes a plurality of data pulses. The scan driving signal produces a scan signal and includes a plurality of scan pulses corresponding to the plurality of data pulses, respectively. By controlling the pluralities of data pulses and scan pulses and the backlight, the color sequential LCD will display an image. The voltage levels of the pluralities of data pulses and scan pulses change according to different images. Thereby, power consumed by the control circuit can be reduced. In addition, color-mixing problems will be reduced according to the present invention.

18 Claims, 6 Drawing Sheets

CIRCUIT FOR CONTROLLING COLOR SEQUENTIAL LIQUID CRYSTAL DISPLAY AND METHOD FOR CONTROLLING THE SAME

FIELD OF THE INVENTION

The present invention relates to a control circuit and a control method, and particularly to a circuit for controlling a color sequential liquid crystal display and a method for controlling the same.

BACKGROUND OF THE INVENTION

With flourishing advancements in technologies, various information products are developed to satisfy people's different needs. In early days, the majority of displays are cathode ray tube (CRT) displays. However, because of their huge size and power consumption as well as health concern due to radiation exposure for long-term users, CRT displays are replaced gradually by liquid crystal displays (LCDs) at present. LCDs own the advantages of lightness, thinness, shortness, smallness, low radiation, and low power consumption. Thereby, they have become the main stream of the market.

Currently, in order to achieve the characteristics of large size, color, thinness, lightness, and low power consumption of LCDs, high-performance light sources have to be developed. LCDs are non-light-emitting displays. Thereby, in the environment with bad light conditions, illumination methods have to be applied. For example, LCD in a watch utilize a simple light bulb for illumination; those in automotive meters or OA terminals adopt light sources from back of the LCDs for clear displays. The thin and white light sources used this way is named backlight.

A backlight is comprised of a light source and a diffuser. Because the backlight has to be a plane light source, point light sources, such as incandescent lamps, or line light source, such as fluorescent lamps, are transformed to plane light sources via the diffuser. The light sources of traditional backlights include incandescent lamps, light-emitting diodes (LEDs), electro luminescent (EL) lamps, fluorescent lamps, and flat fluorescent lamps. The lighting manners include direct lighting and edge lighting. In general, a LCD panel is composed of a plurality of pixels arranged in matrix form. By inputting image data of each pixel, the brightness of the pixel can be controlled and thus a picture can be displayed on the LCD panel. In addition, because only grey-scale can be displayed for each pixel, another manner has to be utilized to display colors.

LCDs according to the prior art use color filters to display the three primary colors of a pixel and hence colors can be displayed. A pixel of such LCD with color filter is composed of three sub pixels corresponding to red, green, and blue color filters, respectively. Human eyes receive the red, green, and blue lights passing through the color filters and mix them to form the color of the pixel.

Besides, color sequential LCDs according to the prior art display sequentially the three primary colors of a pixel to form color. In this color sequential LCD, each pixel uses three light sources to emit red, green, and blue lights, respectively, as the backlight. In a frame time, the pixel displays three data sequentially corresponding to lighting red, green, and blue lights, respectively. By taking advantage of the visual staying phenomenon of human eyes, people can identify the color of the pixel. In comparison with LCDs with color filters, color sequential LCDs do not need to use color filters and thus costs can be saved. In addition, because only one pixel is needed to determine the color of the pixel in a color sequential LCD, thereby the resolution can be increased by three times.

Nevertheless, the color sequential LCD according to the prior art has several disadvantages. For color sequential twisted nematic (TN) LCDs and color sequential super twisted nematic (STN) LCDs, the control circuit thereof produces a scan signal and a data signal. The voltage difference between the scan signal and the data signal is used to control the orientation of liquid crystals. Hence, the transmittivity of the backlight and thereby the color of output image can be determined. The voltage difference described above is called pixel voltage. Modern scan signal is a voltage signal with a fixed level. The control circuit controls the level of the data signal for adjusting the voltage difference between the scan signal and the data signal to determine the pixel voltage and hence the color of the image. Consequently, when a larger pixel voltage is required for rotating the liquid crystals to larger angles, because the level of the scan signal is fixed, the level of the data signal has to be raised higher. Thus, the power consumption of the control circuit is increased. Furthermore, modern color sequential LCDs have color-mixing problems, which make colors displayed by the displays be deviated from as expected and reduce display performance.

Accordingly, the present invention provides a novel circuit for controlling a color sequential liquid crystal display and a method for controlling the same, which control the voltage difference between the scan signal and the data signal by adjusting the voltage levels of both the scan and the data signals. Thereby, power consumption of the control circuit can reduced and color-mixing problems can be solved.

SUMMARY

An objective of the present invention is to provide a circuit for controlling a color sequential liquid crystal display and a method for controlling the same, which control the output colors of the color sequential LCD by adjusting the voltage levels of both the scan and the data signals. Thereby, power consumption and color-mixing problems can be reduced.

Another objective of the present invention is to provide a circuit for controlling a color sequential liquid crystal display and a method for controlling the same, which control the output colors of the color sequential LCD by increasing white backlight. Thereby, brightness and color gamut of the color sequential LCD can be enhanced.

The color sequential LCD according to the present invention comprises a light-source driving circuit, a data driving circuit, and a scan driving circuit. The light-source driving circuit produces a driving signal and transmits to the color sequential LCD for controlling the color sequential LCD to produce backlight with different colors. The data driving circuit produces a data signal, which includes a plurality of data pulses, and transmits to the color sequential LCD. The scan driving signal, which includes a plurality of scan pulses corresponding to the plurality of data pulses, respectively. The color sequential LCD displays an image according to the plurality of scan pulses, the plurality of data pulses, and the backlight. The voltage levels of the pluralities of data pulses and scan pulses can be changed according to different images.

Moreover, the color sequential LCD according to the present invention further comprises a timing control circuit, which produces a timing signal and transmits to the light-source driving circuit, data driving circuit, and scan driving circuit for producing the driving signal, data signal, and scan signal according to the timing signal, respectively.

DETAILED DESCRIPTION

In order to make the structure and characteristics as well as the effectiveness of the present invention to be further understood and recognized, the detailed description of the present invention is provided as follows along with preferred embodiments and accompanying figures.

Figure 1:
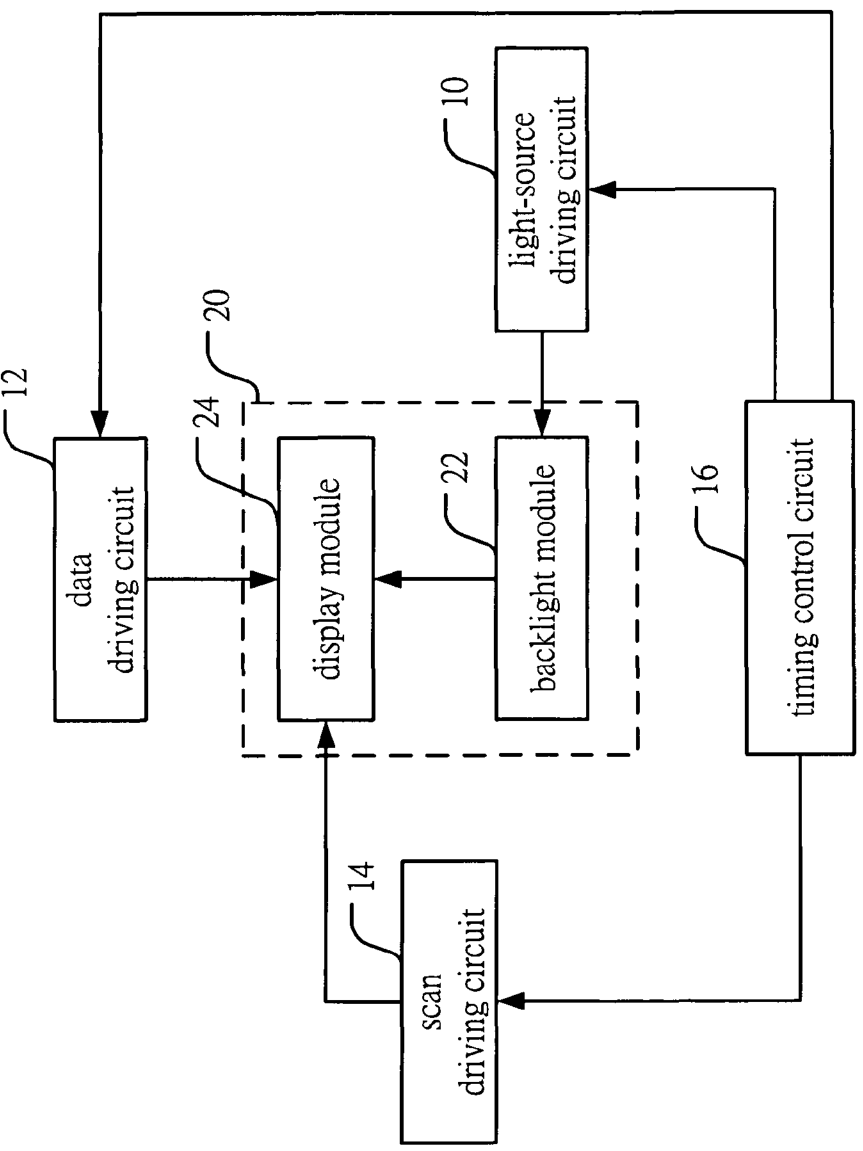
FIG. 1 shows a block diagram according to a preferred embodiment of the present invention.

FIG. 1 shows a block diagram according to a preferred embodiment of the present invention. The control circuit according to the present invention can be applied but not limited to a twisted nematic (TN) LCD or a super twisted nematic (STN) LCD. As shown in the FIG. 1, the control circuit according to the present invention comprises a light-source driving circuit 10, a data driving circuit 12, and a scan driving circuit 14. The color sequential LCD includes a display panel 20, which comprises a backlight module 22 and a display module 24. The light-source driving circuit 10 is used for producing a driving signal and transmitting the driving signal to the backlight module 22 of the display panel 20 for controlling the backlight module 22 to produce sequentially backlights with different colors. The backlights include a red backlight, a green backlight, and a blue backlight.

The data driving circuit 12 is used for producing a data signal and transmitting the data signal to the display module 24 of the display panel 20. The data signal comprises a plurality of data pulses. The scan driving circuit 14 is used for producing a scan signal and transmitting the scan signal to the display module 24 of the display panel 20. The scan signal includes a plurality of scan pulses corresponding to the plurality of data pulses, respectively.

The display panel 20 of the color sequential LCD produces sequentially backlights according to the pluralities of scan and data pulses as well as to the backlight module 22 and displays an image. The display module 24 determines transmittivity, which is determined by the orientations of the liquid crystals in the display module 24, of the backlights according to the voltage difference between the voltage levels of the scan pulses and data pulses, namely, the pixel voltage, and thus displays an image. The voltage levels of the pluralities of the scan pulses and data pulses according to the present invention change according to the colors of different images.

Referring again to FIG. 1, the color sequential LCD according to the present invention further comprises a timing control circuit 16, which produces a timing signal according to the image to be displayed on the color sequential LCD, and transmits the timing signal to the light-source driving circuit 10, the data driving circuit 12, and the scan driving circuit 14. The light-source driving circuit 10, the data driving circuit 12, and the scan driving circuit 14 receive the timing signal, produce the driving signal, the data signal, and the scan signal according to the timing signal, and drive the display panel 20 to display the image. Besides, the timing control signal 16, the data driving circuit 12, and the scan driving circuit 14 can be integrated into a control chip for saving areas occupied by the control circuit and thus saving costs. Furthermore, the light-source driving circuit 10 can be integrated into the control chip as well.

Because the scan driving circuit 14 according to the present invention can adjust the voltage level of the scan pulses of the scan signal, by adjusting the voltage levels of both the scan pulses and the data pulses, the voltage difference there between, which is the pixel voltage, can be adjusted, thereby the voltage required by the control circuit can be reduced. For example, if the pixel voltage of the display module 24 is 5V, the scan driving circuit 14 according to the present invention can adjust the voltage level of the scan pulses to be 2.5V, and the data driving circuit 12 can adjust the voltage level of the data pulses to be −2.5V. Hence, a 5V pixel voltage is produced. Consequently, in comparison with the control circuit according to the prior art, the control circuit according to the present invention consumes less power. In the above description, adjusting the voltage levels of the scan pulses and data pulses to positive and negative voltages, respectively, is only a preferred embodiment of the present invention, not used to limit the scope and range of the present invention.

Figure 2A:
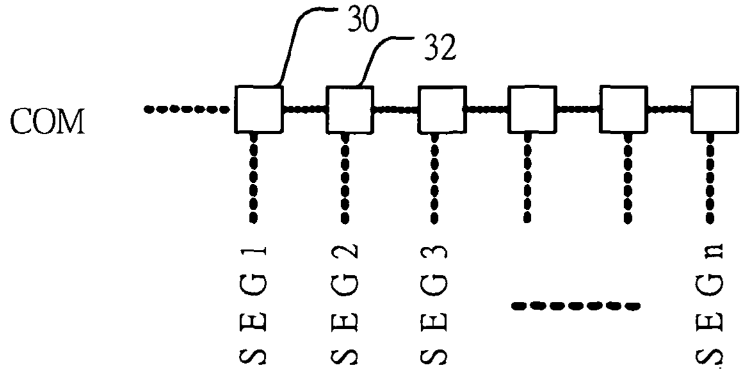
FIG. 2A shows a schematic diagram of pixels according to a preferred embodiment of the present invention.
Figure 2B:
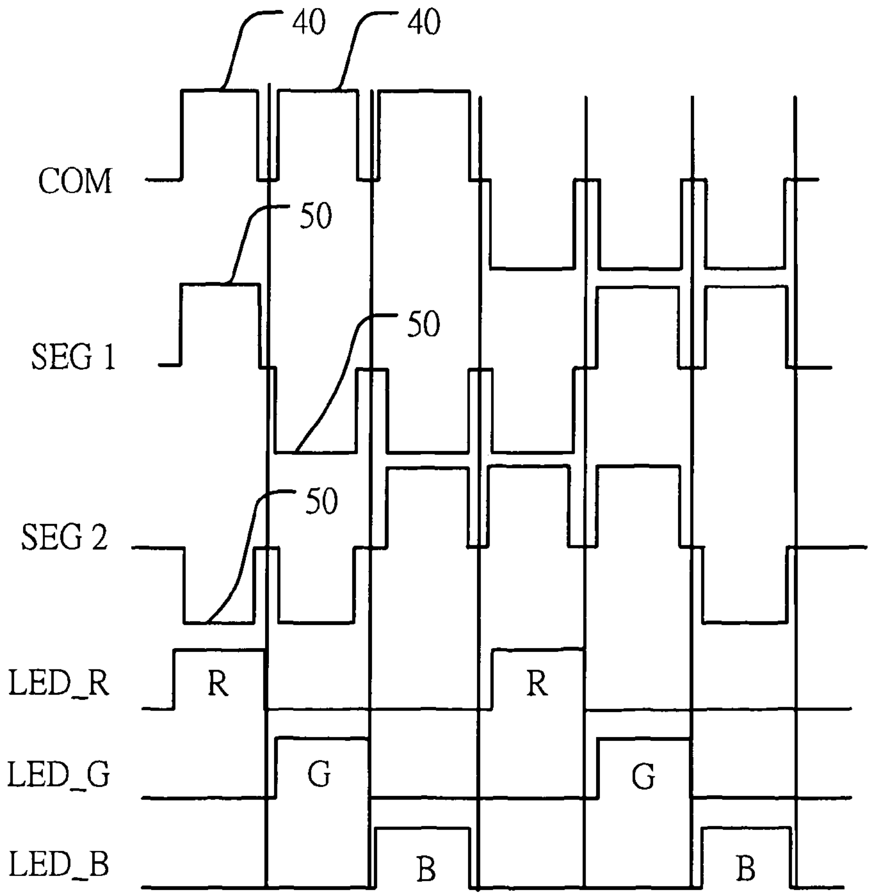
FIG. 2B shows a timing diagram according to a preferred embodiment of the present invention.

FIGS. 2A and 2B show a schematic diagram of pixels and a timing diagram according to a preferred embodiment of the present invention, respectively. "COM" in the figures represents the scan signal; "SEG" represents the data signal; and "LED_R", "LED_G", and "LED_B" represent the driving signals for driving red backlight, green backlight, and blue backlight, respectively. The preferred embodiment shown in FIG. 2A illustrates a row of pixels in the display panel 20 for example. The row of pixels receives the same scan signal "COM", and receives different data signals "SEG1" to "SEGn", respectively. Thereby, colors are displayed according to the voltage level of the scan pulses of the scan signal and the voltage level of the data pulses of the data signal.

As shown in FIG. 2B, the scan signal "COM" according to the present invention includes a plurality of scan pulses 40; and the data signal "SEG1" and "SEG2" include a plurality of data pulses 50. The light-source driving circuit 10 according to the present invention drives the backlight module 22 to produce sequentially red backlight, green backlight, and blue backlight to complete a color sequence cycle. According to the image to be displayed on the display panel 20, the data driving circuit 12 and the scan driving circuit 14 control the voltage levels of the data pulses 50 of the data signals "SEG1" and "SEG2", as well as the voltage levels of the scan pulses 40 of the scan signal "COM", namely, the voltage difference there between (pixel voltage), for controlling the transmittivity of the backlight through the liquid crystals. Thereby, the first pixel 30 and the second pixel 32 of the display panel 20 can display the expected colors.

Figure 3A:
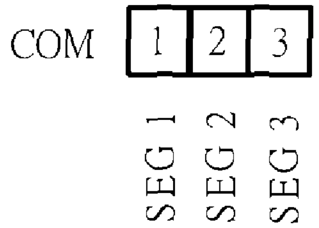
FIG. 3A shows a schematic diagram of pixels according to another preferred embodiment of the present invention.
Figure 3B:
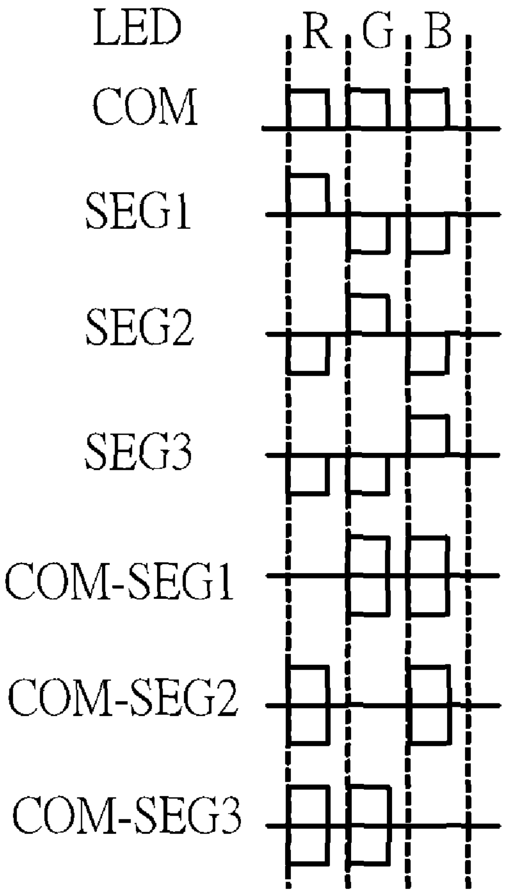
FIG. 3B shows a timing diagram according to another preferred embodiment of the present invention.

FIG. 3A shows a scan signal "COM" and three data signals "SEG1", "SEG2", and "SEG3" for controlling three pixels. The first pixel 1 is controlled by the scan signal "COM" and the first data signal "SEG1"; the second pixel 2 is controlled by the scan signal "COM" and the second data signal "SEG2"; and the third pixel 3 is controlled by the scan signal "COM" and the third data signal "SEG3". As shown in FIG. 3B, the light-source driving circuit 10 drives the backlight module 22 to produce sequentially red backlight "R", green backlight "G", and blue backlight "B". After a complete color sequence cycle, the first, second, and third pixels 1, 2, 3 will display red, blue, and green, respectively.

For pixel 1, when the backlight module 22 produces red backlight, the voltage level of the first scan pulse of the scan signal "COM" is high, and the voltage of the first data pulse of the first data signal "SEG1" is high. Thereby, the voltage difference there between ("COM-SEG1") is zero. At this moment, the liquid crystal will not rotate and the red backlight can pass through. Afterwards, when the backlight module 22 produces green backlight "G" and blue backlight "B", the voltage level of the scan pulse of the scan signal "COM" differs from the voltage level of the data pulse of the first data signal "SEG1". Thereby, a voltage difference exists there between and the liquid crystal will rotate to block the green backlight and blue backlight from passing through. Consequently, the first pixel 1 will appear red. Likewise, the second and third pixels 2, 3 will appear green and blue, respectively.

Figure 4:
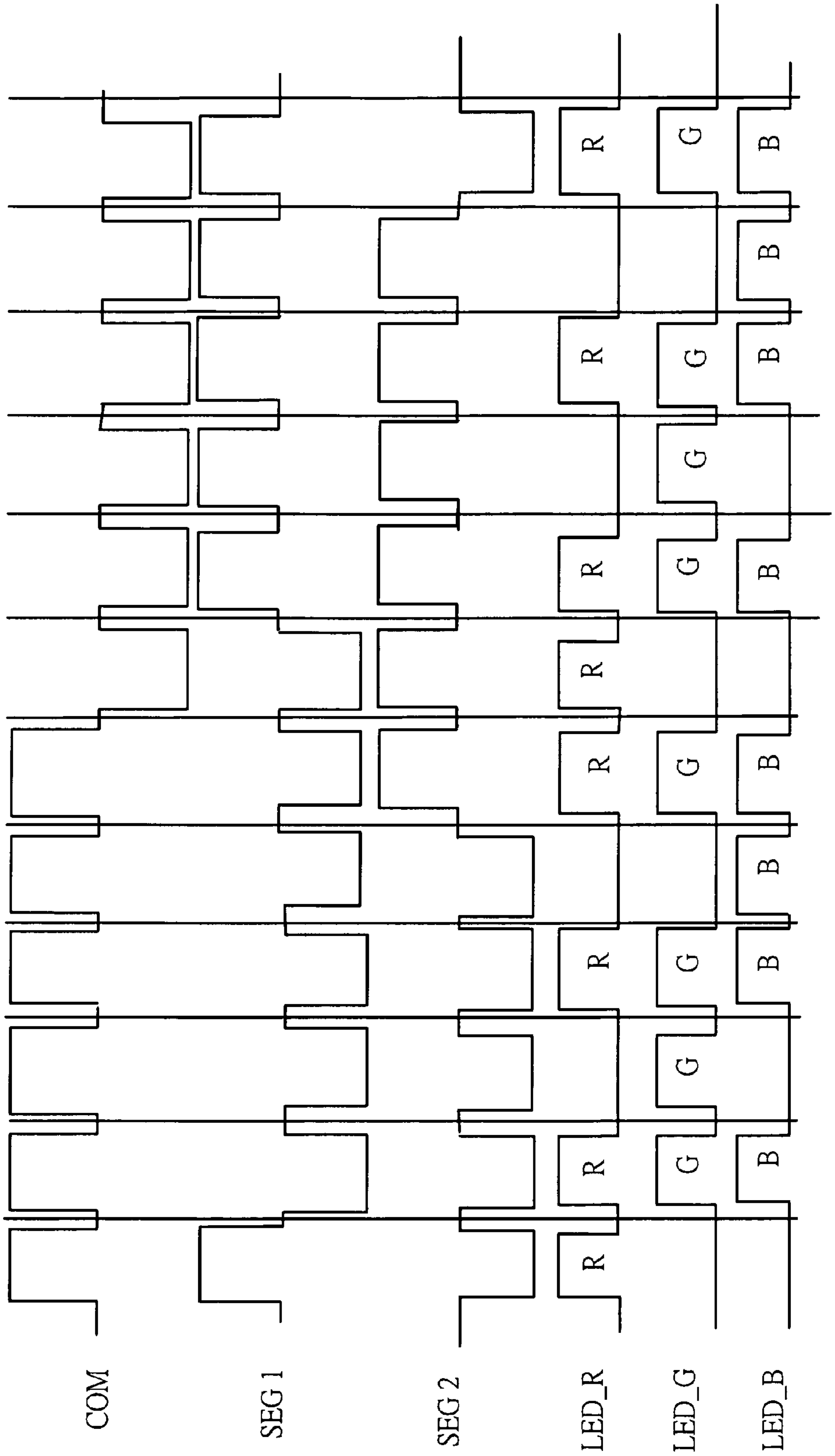
FIG. 4 shows a timing diagram according to another preferred embodiment of the present invention.

FIG. 4 shows a timing diagram according to another preferred embodiment of the present invention. As shown in the FIG. 4, the difference between the present preferred embodiment and the previous is that in the present preferred embodiment, the backlight further includes white backlight. That is, the light-source driving circuit 10 drives the backlight module 22 to produce simultaneously red backlight, green backlight, and blue backlight and mix to be white backlight. The white backlight is produced after the red, green, and blue backlights, respectively. Namely, the backlight module 22 produces sequentially red backlight, white backlight, green backlight, white backlight, blue backlight, and white backlight. Thereby, by adjusting the transmittivity of the white backlight passing through the liquid crystals, the colors displayed by the pixels can be adjusted accordingly and hence more colors can be displayed. In addition, the brightness can be increased, and the image performance can be enhanced.

Figure 5A:
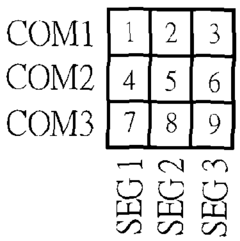
FIG. 5A shows a schematic diagram of pixels according to another preferred embodiment of the present invention.
Figure 5B:
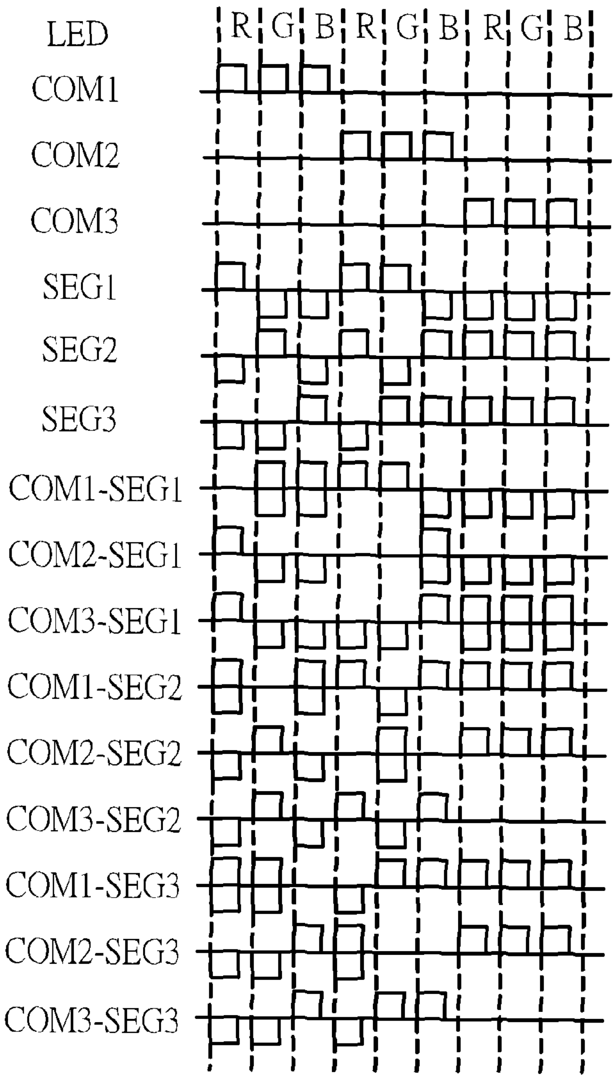
FIG. 5B shows a timing diagram according to another preferred embodiment of the present invention.

FIGS. 5A and 5B show a schematic diagram of pixels and a timing diagram according to another preferred embodiment of the present invention. As shown in the figures, the scan driving circuit 14 according to the present invention can produce a plurality of scan signals to make the pixels be arranged in matrix form. As shown in FIG. 5A, for controlling the nine pixels 1~9, the scan driving circuit 14 produces three scan signals "COM1", "COM2", and "COM3", and the data driving circuit 12 produces three data signals "SEG1", "SEG2", and "SEG3" as well. Because the scan signals "COM1", "COM2", and "COM3" according to the present invention have a plurality of scan pulses and correspond to a plurality of data pulses of the data signals "SEG1", "SEG2", and "SEG3", color-mixing problems can be reduced as described below.

In the preferred embodiment of FIG. 5B, there exist three scan signals "COM1", "COM2", and "COM3". Thereby, a color sequence to complete a frame consists three cycles of red backlight "R", green backlight "G", and blue backlight "B" sequence, namely, three backlight cycles "RGB". According to the waveforms of FIG. 5B, the colors displayed on the pixels 1~9 are red, green, blue, yellow, purple, indigo, black, white, and white, respectively. For pixel 1, the pixel voltage thereof is the voltage difference between the scan pulse of the first scan signal "COM1" and the data pulse of the first data signal "SEG1", namely, "COM1-SEG1" in FIG. 5B. In the first backlight cycle, the red backlight, but not green or blue backlights, passes through the liquid crystal. Afterwards, in the second backlight cycle, 50% of red, greed, and blue backlights, respectively, pass through the liquid crystal to mix white. At last, in the third backlight cycle, again, 50% of red, greed, and blue backlights, respectively, pass through the liquid crystal to mix white. Thereby, the color display on the pixel 1 will be the mixed color of red and white. Because white will not influence color too much, the first pixel 1 will appear red.

Likewise, the pixel voltage of the fourth pixel 4 is "COM2-SEG1". In the first backlight cycle, 50% of red, greed, and blue backlights, respectively, pass through the liquid crystal to mix white. Afterwards, in the second backlight cycle, the red and green backlights pass through the liquid crystal to mix yellow. Finally, in the third backlight cycle, 50% of red, greed, and blue backlights, respectively, pass through the liquid crystal again to mix white. Thereby, the color displayed on the fourth pixel 4 is the mixed color of yellow and white. Again, because white will not influence color too much, the first pixel 4 will appear yellow. From the description above, in the present preferred embodiment, the pixel 1~9 are mixed with white without influencing the expected color. Hence, the color-mixing problems can be reduced while increasing brightness. Consequently, the performance of the display in enhanced.

Figure 6A:
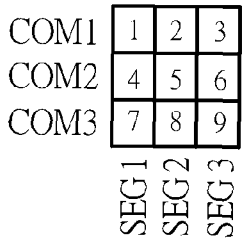
FIG. 6A shows a schematic diagram of pixels according to another preferred embodiment of the present invention.
Figure 6B:
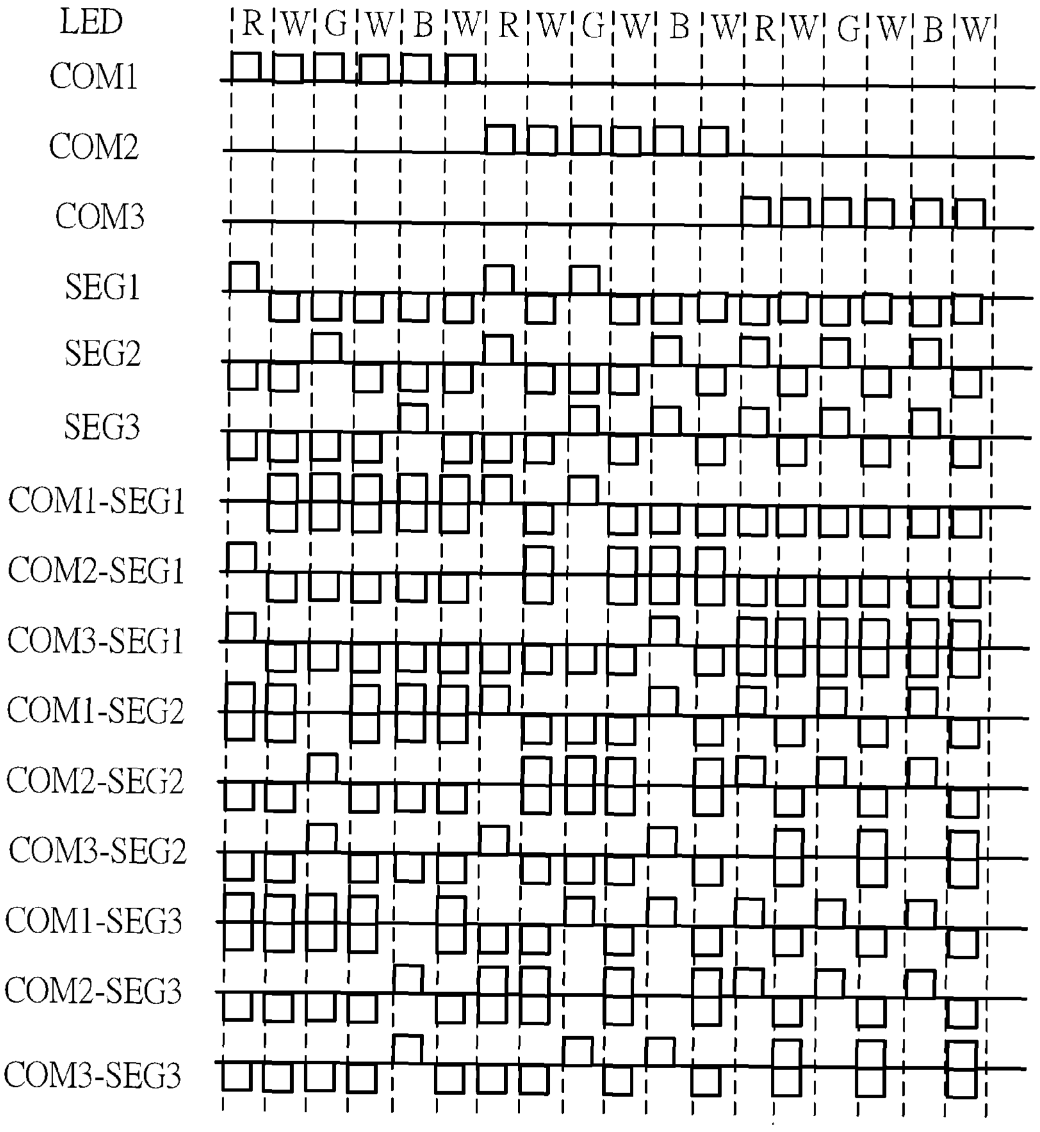
FIG. 6B shows a timing diagram according to another preferred embodiment of the present invention.

FIGS. 6A and 6B show a schematic diagram of pixels and a timing diagram according to another preferred embodiment of the present invention. The present preferred embodiment is similar to the one in FIG. 4 by inserting white backlight "W" after red backlight "R", green backlight "G", and blue backlight "B", respectively, for increasing color gamut of the pixels 1~9. Besides, the brightness of the display can be increased as well.

To sum up, the circuit for controlling a color sequential liquid crystal display and the method for controlling the same according to the present invention display images by controlling the display module using a plurality of scan pulses of the scan signal and a plurality of data pulses of the data signal. The voltage levels of the pluralities of data pulses and scan pulses will change according to different images. Thereby, power consumed by the control circuit can be reduced. In addition, color-mixing problems will be reduced in color sequential LCDs according to the present invention.

Accordingly, the present invention conforms to the legal requirements owing to its novelty, non-obviousness, and utility. However, the foregoing description is only a preferred embodiment of the present invention, not used to limit the scope and range of the present invention. Those equivalent changes or modifications made according to the shape, structure, feature, or spirit described in the claims of the present invention are included in the appended claims of the present invention.

The invention claimed is:

1. A circuit for controlling a color sequential liquid crystal display (LCD), comprising:

a light-source driving circuit, producing a driving signal and transmitting to the color sequential LCD for controlling the color sequential LCD to produce backlights with different colors;

a data driving circuit, producing a data signal and transmitting to the color sequential LCD, and the data signal including a plurality of data pulses; and a scan driving circuit, producing a scan signal and transmitting to the color sequential LCD, and the scan signal including a plurality of scan pulses corresponding to the plurality of data pulses, respectively;

wherein the color sequential LCD displays an image according to the voltage amplitude differences between the pluralities of scan pulses and data pulses and according to the backlights, and the voltage amplitudes of the pluralities of data pulses and scan pulses are changed according to different images.

2. The circuit of claim 1, wherein the voltage amplitudes of the plurality of scan pulses are changed according to the colors of the image.

3. The circuit of claim 1, and further comprising a timing control circuit, producing a timing signal and transmitting to the light-source driving circuit, the data driving circuit, and the scan driving circuit for producing the driving signal, the data signal, and the scan signal, respectively, according to the timing signal.

4. The circuit of claim 3, where the timing control circuit, the data driving circuit, and the scan driving circuit can be integrated into a control chip.

5. The circuit of claim 4, wherein the control chip further integrates the light-source driving circuit.

6. The circuit of claim 1, wherein the backlights controlled by the driving signal of the color sequential LCD include a red backlight, a green backlight, and a blue backlight.

7. The circuit of claim 6, wherein the backlights further include a white backlight.

8. The circuit of claim 7, wherein the white backlight is produced after the red backlight, the green light, and the blue backlight, respectively.

9. The circuit of claim 1, wherein the color sequential LCD further comprises:

a backlight module, producing backlights with different colors according to the driving signal; and a display module, displaying the image according to the data signal, the scan signal, and the backlights.

10. The circuit of claim 1, wherein the circuit for controlling the color sequential LCD is applied to a twisted nematic (TN) LCD or a super twisted nematic (STN) LCD.

11. A method for controlling a color sequential liquid crystal display (LCD), comprising the steps of:

producing a driving signal and transmitting to the color sequential LCD, for controlling the color sequential LCD to produce backlights with different colors;

producing a data signal and transmitting to the color sequential LCD, the data signal including a plurality of data pulses; and producing a scan signal and transmitting to the color sequential LCD, the scan signal including a plurality of scan pulses corresponding to the plurality of data pulses, respectively;

wherein the color sequential LCD displays an image according to the voltage amplitude differences between the pluralities of scan pulses and data pulses and according to the backlights, and the voltage amplitudes of the pluralities of data pulses and scan pulses are changed according to different images.

12. The method of claim 11, wherein the voltage amplitudes of the plurality of scan pulses are changed according to the colors of the image.

13. The method of claim 11, and further comprising producing a timing signal, for producing the driving signal, the data signal, and the scan signal, respectively, according to the timing signal.

14. The method of claim 11, wherein the backlights controlled by the driving signal of the color sequential LCD include a red backlight, a green backlight, and a blue backlight.

15. The method of claim 14, wherein the backlights further include a white backlight.

16. The method of claim 15, wherein the white backlight is produced after the red backlight, the green light, and the blue backlight, respectively.

17. The method of claim 11, wherein the driving signal is transmitted to a backlight module of the color sequential LCD for producing backlights with different colors according to the driving signal, and the data signal and the scan signal are transmitted to a display module of the color sequential LCD for displaying the image according to the data signal, the scan signal, and the backlights.

18. The method of claim 11, wherein the method for controlling the color sequential LCD is applied to a twisted nematic (TN) LCD or a super twisted nematic (STN) LCD.

* * * * *